United States Patent
Zhang et al.

(10) Patent No.: US 10,779,043 B2
(45) Date of Patent: Sep. 15, 2020

(54) DATABASE ACCESS USING ENTITY AND AVAILABILITY PAIRS IN A VIDEO DELIVERY SYSTEM

(71) Applicant: HULU, LLC, Santa Monica, CA (US)

(72) Inventors: Minlin Zhang, Los Angeles, CA (US); Hank Hwang, Los Angeles, CA (US); Yingan Wang, Los Angeles, CA (US)

(73) Assignee: HULU, LLC, Santa Monica, CA (US)

( * ) Notice: Subject to any disclaimer, the term of this patent is extended or adjusted under 35 U.S.C. 154(b) by 65 days.

(21) Appl. No.: 16/248,291

(22) Filed: Jan. 15, 2019

(65) Prior Publication Data
US 2019/0182553 A1 Jun. 13, 2019

Related U.S. Application Data

(63) Continuation of application No. 15/839,113, filed on Dec. 12, 2017, now Pat. No. 10,212,479.

(51) Int. Cl.
*H04N 21/472* (2011.01)
*H04N 21/2187* (2011.01)
*H04L 29/08* (2006.01)
*H04N 21/258* (2011.01)
*H04N 21/45* (2011.01)
*G06F 16/738* (2019.01)
*G06F 16/71* (2019.01)

(52) U.S. Cl.
CPC ....... *H04N 21/47214* (2013.01); *G06F 16/71* (2019.01); *G06F 16/738* (2019.01); *H04L 67/306* (2013.01); *H04N 21/2187* (2013.01); *H04N 21/25841* (2013.01); *H04N 21/4532* (2013.01)

(58) Field of Classification Search
CPC .......................... G06F 17/30; G06F 17/30837
See application file for complete search history.

(56) References Cited

U.S. PATENT DOCUMENTS

2006/0200842 A1* 9/2006 Chapman ........... H04N 21/4882 725/34
2012/0124613 A1* 5/2012 Reddy .............. H04N 21/41407 725/27

(Continued)

OTHER PUBLICATIONS

International Search Report and Written Opinion for International Appln. No. PCT/US2018/064590 dated Apr. 1, 2019, 9 pages.

*Primary Examiner* — Michael R Telan
(74) *Attorney, Agent, or Firm* — Fountainhead Law Group, PC

(57) ABSTRACT

In one embodiment, a method uses a notification of a programming event to determine an entity of a media program and an availability pair. The availability pair identifies an entitlement and a location combination for viewing the media program. the method queries a database using the entity and the availability pair in a query to determine a first set of user profiles associated with the entity and a second set of user profiles associated with the availability pair. The first list of user profiles and the second list of user profiles are analyzed to select at least the portion of the first set of user profiles and the second set of user profiles. Then, the method performs an action for the at least the portion of the first set of user profiles and the second set of user profiles based on an occurrence of the programming event.

20 Claims, 9 Drawing Sheets

(56) References Cited

U.S. PATENT DOCUMENTS

2012/0254917 A1\* 10/2012 Burkitt .................. G06F 16/735
                                                                        725/40
2016/0171540 A1    6/2016  Mangipudi et al.
2017/0064357 A1    3/2017  Jabara et al.

\* cited by examiner

DATABASE ACCESS USING ENTITY AND AVAILABILITY PAIRS IN A VIDEO DELIVERY SYSTEM

CROSS REFERENCE TO RELATED APPLICATIONS

This application is a continuation application and, pursuant to 35 U.S.C. § 120, is entitled to and claims the benefit of earlier filed application U.S. application Ser. No. 15/839,113 filed Dec. 12, 2017, the content of which is incorporated herein by reference in its entirety for all purposes.

BACKGROUND

A video delivery system may include different databases that store different aspects of information for a video delivery service, such as a first database storing user interests, a second database for users' entitlements to view content, and a third database for users' locations. The backend system of the video delivery system includes different services that can handle requests and query the different databases. The services are configured to specifically store data in respective databases by indexing user profiles. Indexing the user profiles provides efficiencies because the services receive data, such as a user's interest, and can then store the user's interest with the user profile in the first database.

Multiple engines of the video delivery system may need to access the data via the services for different reasons. Also, some engines require data from multiple separate databases to provide a feature for delivering video to users. For example, a feature may require data about a user from a first database, and then use that data to query the second and third databases. This requires that the engine send queries to multiple services to retrieve the data. Given that the video delivery service may include a large amount of users, if an engine sends queries for a majority of the users at one time, the backend network may experience a spike in traffic. This may slow down processing time for other engines that may need to access the data and also slow down the queries being executed for the current engine.

DETAILED DESCRIPTION

Figure 1:
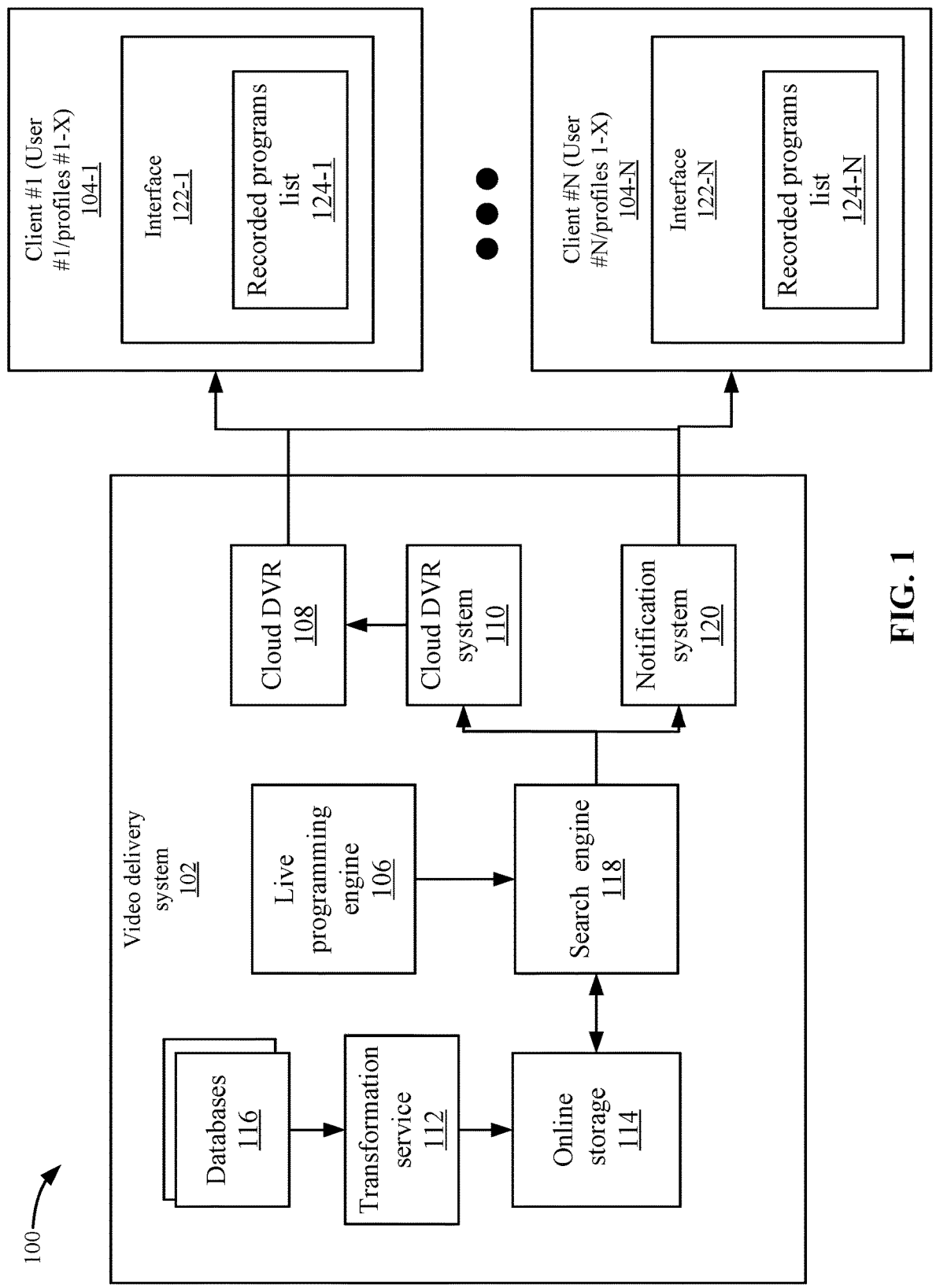
FIG. 1 depicts a simplified system for implementing a search engine using an online database to respond to scheduled events according to some embodiments.

Described herein are techniques for a video recording and notification system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

A video delivery system may experience times in which an engine may perform a large amount of queries at one time. For example, when the video delivery system provides a live television service, the video delivery system may have a cloud digital video recorder (DVR) feature and a push notification feature. The live television service may provide linear live programming where new media programs may start at set times, such as every half hour or hour. In some cases, there may be a large amount of media programs starting at the same time in the schedule. When the video delivery system determines that a media program is going to start, then the video delivery system may determine which users may be interested in the media program to either record the program or provide a notification to users. For example, a search engine determines which users meet the requirements for recording the media program or receiving a notification. In some embodiments, the search engine determines users that have the required interest in the upcoming media program, the entitlements to view the media program, and location information within an availability area for the program. As discussed in the Background, this may require multiple queries to different databases for each user, which causes a spike in activity in the backend network right before the media program is going to air. When multiple media programs start at the same time, then the spike in traffic increases even more.

To alleviate the spike in traffic in the backend network, the video delivery system generates a transformed database structure in an online database that may limit the spike in traffic on the backend network and also allow efficient querying the required data with less queries. A transformation engine may load required data from the various databases by querying, per user profile, the interests in entities from a first database, entitlements for viewing the entities from a second database, and location information from a third database. The transformation engine then transforms the format of how the data was stored in the first, second, and third databases. For example, the transformation engine combines the entitlements and location information into an availability pair. Then, the transformation engine stores entities for the interests and the availability pairs in an inverted format compared to how the data was stored in the first, second, and third databases. The inverted format indexes the entities for the interests and availability pairs with a list of profiles as entries for the index. The transformation engine stores the transformed data in an online database that can be queried when live programming events occur.

The use of the online database and transformed data allows the search engine that is processing the live programming events to efficiently perform the queries. The transformed format allows the queries to be performed faster than querying the first, second, or third databases. Further, the format allows the search engine to retrieve the required data with a fewer amount of queries as compared to when the data was stored in separate databases. Additionally, using the online database limits the spike in network traffic on the backend network because queries are now directed to the online database. The other backend databases now can process queries from other engines without experiencing the delay caused by the spike in searches.

Overview

FIG. 1 depicts a simplified system 100 for implementing a search engine 118 using an online storage 114 to respond to scheduled events according to some embodiments. System 100 includes a video delivery system 102 and clients 104-1 to 104-N. Video delivery system 102 may provide a video delivery service that sends media programs (e.g., videos) to clients 104. Clients 104-1 to 104-N may view the media programs on an interface 122-1 to 122-N, which may include a media player (not shown). Video delivery system 102 may allow users to request videos on-demand or subscribe to a live television service. The media programs that can be requested on-demand are included in a video library and clients 104 can request the media programs at any time. The live television service may broadcast media programs in a linear manner, such as via a televised schedule. In this example, the live television service offers media programs that can only be viewed on a set schedule. In some embodiments, the schedule includes media programs that start around the same time, such as at half-hour or hour intervals. For example, at the top of every hour, the live television service may begin offering new media programs on multiple channels. Clients 104-1 to 104-N may view the media programs on an interface 122-1 to 122-N, which may include a media player (not shown).

A live programming engine 106 may monitor the schedule, such an electronic program guide (EPG) that specifies which media programs are upcoming, and determine which media programs are going to be aired before the airtime, right when the media program airs, or after the media program airs. For example, live programming engine 106 may determine the videos that are going to be aired X seconds before the video is going to be aired. The X seconds may be within a minute of the start of the media program, or during when the previous media program is being aired. Also, live programming engine 106 may start recording the media programs right after they start to air. Live programming engine 106 makes this determination close to the airtime because the latest data on user interests, entitlements, and/or location should be used.

In one example, a cloud DVR system 110 may be programmed to record videos for a user prior to the media program airing, right when the media program airs, or after the media program airs. Accordingly, live programming engine 106 determines the media programs that are going to be aired close to the airtime so that cloud DVR system 110 can start recording of the media programs for users. Cloud DVR system 110 can then store the media programs in cloud DVRs 108 for different users. These media programs are stored to allow users to play the media programs at a later time that is different from the airtime. Once recorded, cloud DVR 108 may then provide a recorded programs list 124-1 to 124-N to clients. For example, users can access a recorded programs list to determine which programs have been recorded. Cloud DVR system 110 may operate automatically, such as a user may not need to figure out the time when a video is going to be offered. Rather, cloud DVR system 110 may determine when programs are going to be offered at a time and record them automatically.

Video delivery system 102 also includes a notification system 120 that can send notifications for events that are going to occur, such as X hours, days, etc. before the event will occur. Some notifications include that certain videos may be expiring or that a video may be about to start. The notification that the video is about to play should be sent close to the time at which the video is going to be played to attract the user's interest.

Search engine 118 may be an online service that can handle the requests to determine users. Search engine 118 is an online engine because it interacts with the live television service being offered online to clients 104.

Databases 116 may include separate databases that store information for users. Users may also include profiles 1-X that may have different attributes, such as interests, entitlements, and location information. For example, users may have profiles for different members of the user's family and can determine different interests, such as different videos that the specific profiles are interested in. The use of profiles may multiply the number of entries in databases 116. When profiles are used in the discussion, it will be understood that a user may have one or more profiles.

Database 116 may include different offline databases. When a user is determined to be interested in a video, an interest database stores an indication of the interest (e.g., an interest indication) for the user profile in the interest database. The interest indication may be a flag, identifier, or other indicator that identifies the interest. In some embodiments, when a user adds a video to a category, such as to My Stuff category in user interface 132, an interest indication for that video may be stored for that user in the interests database. An entitlements database may store information for entitlements for users. The entitlements may be a type of account or a level of subscription service for the users, such as subscription video on-demand (SVOD) only, SVOD plus live television service, SVOD plus a network channel, etc. The entitlements database lists entitlements for the users. In some embodiments, each user profile for a user includes the same entitlements. In other embodiments, the user profiles may each include entitlements. A location database may store location information for user profiles, such as a home location for the user for be associated with all user profiles, but a real-time location may be different for different user profiles. In some embodiments, the location information may be in the form of a distribution area, which indicates a location in which the user resides, such as a ZIP code. The location database lists the user profiles and then the location information associated with each user profile.

Various engines of the video delivery system 102 may use the information stored in these databases 116. If search engine 118 performed the number of queries required for cloud DVR system 110 or notification system 120 at the scheduled times, the queries would cause a large amount of traffic that is accessing databases 116 at the same time. This may delay the processing of queries from other engines that may need to access databases 116. Further, the format of the data stored in databases 116 is optimized for the specific data being stored. For example, the information may be indexed by user profile and the user profiles are used in queries to determine entries in the database. Given the format of databases 116, such as for interests, entitlements or home location, using the users as the index provides efficient access for the offline services. For example, when a user adds an interest, adding the interest to the interests database may be efficient by finding that user profile and adding that interest to the user profile's entries.

The above format that indexes user profiles is efficient for adding data to the databases and for other services to find that data. However, given the spike in traffic due to the live programming events that occur due to the live television service, some embodiments use a transformation service 112 to transform the data found in databases 116 into a format that can be queried more efficiently by search engine 118 for the specific type of queries needed for cloud DVR system 110 and notification system 120. Further, transformation service 112 stores the transformed data in an online storage 114, which can be accessed by search engine 118. For example, online storage 114 may include a local copy of the transformed data that is accessible to search engine 118. Using online storage 114 removes the queries that need to be performed on databases 116 and avoids the spike in traffic at the scheduled times. Online storage 114 may only be accessed by search engine 118 in some embodiments. Also, the format of the data stored in online storage 114 is optimized for queries by search engine 118.

Online Storage 114

Figure 2:
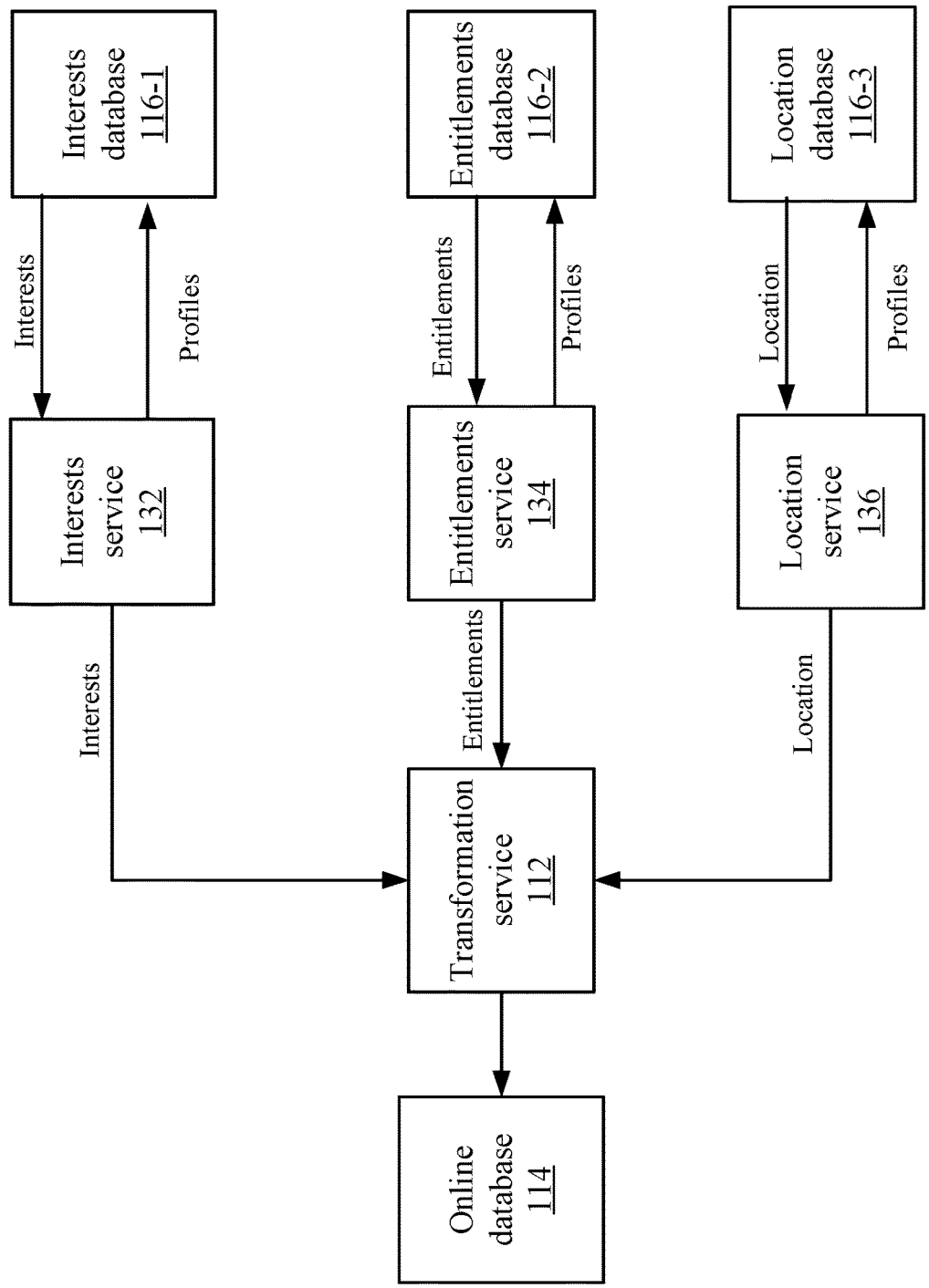
FIG. 2 depicts a more detailed example of generating the online database according to some embodiments.

The following will now describe the building of online storage 114 in more detail. FIG. 2 depicts a more detailed example of generating online storage 114 according to some embodiments. FIG. 2 includes offline databases 116, such as an interests database 116-1, an entitlements database 116-2, and a location database 116-3. Interests database 116-1 indexes the users' profiles and associates interests with each user profile. For example, user profiles may list entities in which a user is interested as interest indications, such as media programs (e.g., shows, movies, sports teams, etc.). Entitlements database 116-2 indexes users' profiles and associates entitlements with each user profile. For example, a user profile may list one or more entitlements for that profile, such as the type of subscription that profile is entitled to use. Location database 116-3 indexes users' profiles and associates location information with each user profile. For example, the home location of users for each user profile is stored as an entry.

To access information in interests database 116-1, entitlements database 116-2, and location database 116-3, a query references the user profiles in the index. For example, an offline interests service 132 may send a query with a user profile in it. The interests associated with that profile in interests database 116-1 may then be returned to offline interests manager 132. Also, when it is determined that a user has an interest in a media program, offline interests server 132 looks up the user profile and adds the interest as an entry to the user's profile in interests database 116-1. Similarly, an entitlements service 134 may send a query to entitlements database 116-2 with a user's profile in the query. Entitlements database 116-2 then returns the entitlements associated with that profile. Also, an location service 136 may send a query to location database 116-3 with the user's profile. Location database 116-3 then returns the location for the profile to location service 136. Similarly, entitlements service 134 may store entitlements using a user's profile as an index in entitlements database 116-2 and location service 136 may store location information using a user's profile as an index in location database 116-3. Accordingly, these offline services can query databases 116-1 to 116-3 using a user profile.

Storing the interests, entitlements, and location information in individual databases 116-1 to 116-3 by indexing the user profiles may be most efficient for the offline services because only individual user profiles are updated at a time, such as when one user profile expresses an interest in a media program, only an entry for that user profile needs to be updated in database 116-1. Also, for the services to retrieve the interests, entitlements, and location, sending a query to these databases using the profiles may be most efficient when dealing with multiple offline services that may require this information. To generate online storage 114, transformation service 112 can perform queries to interests database 116-1, entitlements database 116-2, and location database 116-3 via services 132, 134, and 136, respectively, using the user profiles in the query. Transformation service 112 then receives all of the user profiles with associated interests, entitlements, and location from the various databases. Transformation service 112 can then transform the data. In some embodiments, transformation service 112 transforms the data received into documents where each document is a user profile with associated interests, entitlements, and home location.

Figure 4:
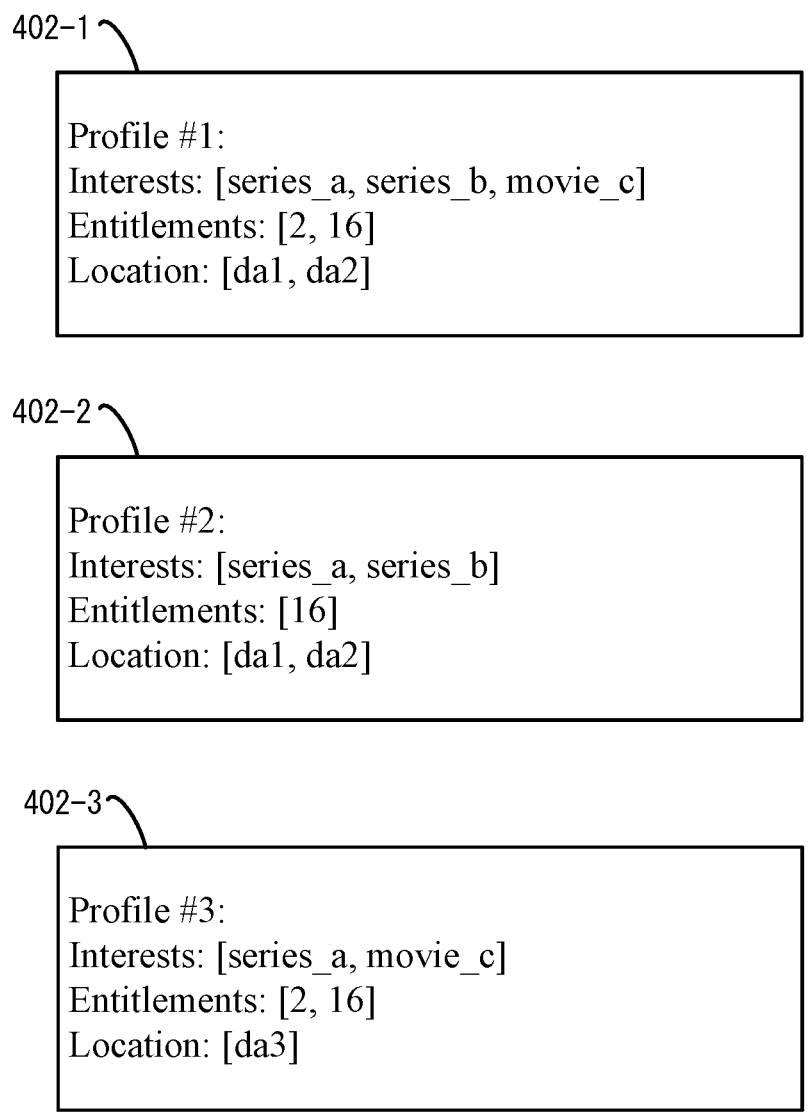
FIG. 4 shows an example of documents according to some embodiments.

FIG. 4 shows an example of documents 402-1 to 402-3 according to some embodiments. Three user profiles are divided into three documents, but it will be understood that other user profiles may be provided. Documents may be stored in a database table or other storage format. Profiles #1, #2, and #3 may be for the same user account, or may be for different users. Also, profiles for different user accounts may have the same interests, entitlements, and location information.

Document 402-1 is associated with a profile #1 and has interests, entitlements, and location information listed. The interests for profile #1 include entities of series_A, series_B, and movie_C. Series_A and series_B may be television shows that each include multiple episodes. Movie_C may be a specific movie. The entitlements for profile #1 are entitlements #2 and #16. The entitlements are associated with which type of account profile #1 is associated with, such as the entitlement #2 may be the SVOD only service and entitlement #16 may be the SVOD service plus live television. The location information lists a distribution area DA1 and a distribution area DA2. Distribution areas may be different locations that are considered the home location for the profile. In some embodiments, distribution areas may be one or more zip codes or other geographic information.

Profile #2 and profile #3 have similar listings for interests, entitlements, and location. Profile #2 differs from profile #1 in that profile #2 does not have an interest in movie_C and only has the entitlement #16. Profile #3 differs from profile #1 in that series_B is not an interest and profile #3 has a different location of distribution area DA3.

Referring back to FIG. 2, transformation service 112 can then build online storage 114. For example, transformation service 112 builds an index in which the interests are indexed instead of the user profiles, which is an inverted indexed from how the data was stored in offline databases 116. Transformation service 112 reviews the documents to determine entities (e.g., media programs) and add user profiles that include the entity in the interests as entries to the entity. For example, a media program may be associated with a list of user profiles that have expressed an interest in that media program. The list of user profiles may include user profiles for different users.

In some embodiments, transformation service 112 then calculates an availability pair using the entitlements and location information for the profiles. For example, different combinations of the entitlements and home location are combined as an availability pair. Transformation service 112 can then index the availability pairs. For example, each availability pair may include a list of profiles. Each profile associated with an availability pair has the respective entitlements and location information for that availability pair. Although availability pairs are described, transformation service may not calculate availability pairs. In this case, transformation service 112 stores entitlements in the index with a list of profiles and home location in the index with a list of profiles. The result of indexing the entitlements and home location individually may require the search engine to perform some calculation to determine which profiles have both the entitlement and location information that is required instead of returning only the user profiles that have both the entitlement and location information.

Figure 3:
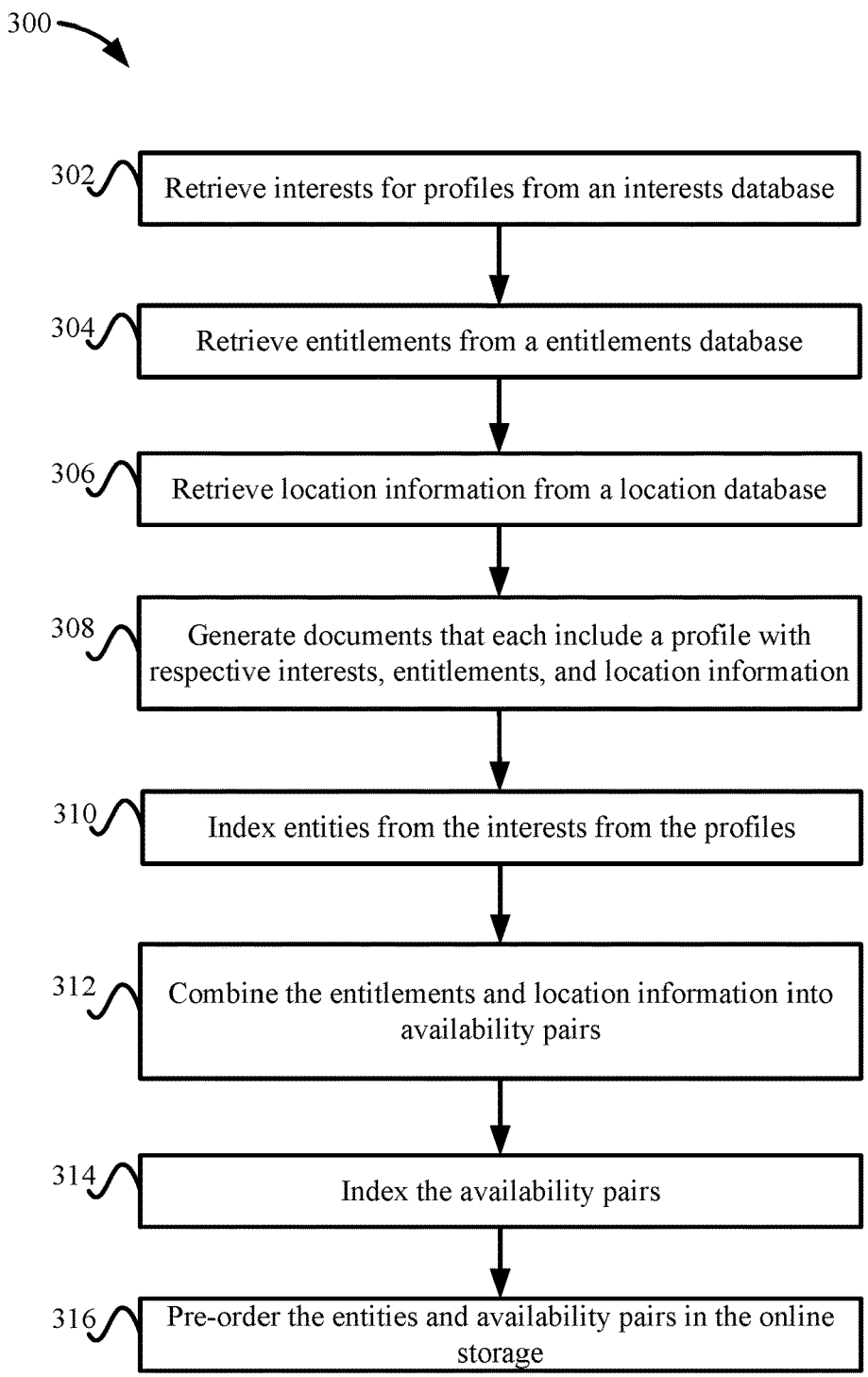
FIG. 3 depicts a simplified flowchart of a method for generating the online database according to some embodiments.

Transformation service 112 may then order the index, such as by entity and availability pair. The order may be via some system, such as alphabetical order, to allow for quicker access. Also, transformation service 112 may generate a skip list data structure. The skip list data structure allows a fast search in the order of the entities and availability pairs. For example, transformation service 112 may maintain a linked hierarchy of sub-sequences with each successive sub-sequence skipping over fewer elements than the previous one. Searching of the skip list can start in the sparsest sub-sequence until two consecutive elements have been found, one smaller and one larger than or equal to the elements searched for. These two elements link to elements of the next sparsest sub-sequence, and the searching can continue until the full sequence is searched. A skip list data structure allows some elements in the list to be skipped while still performing the complete search. FIG. 3 depicts a simplified flowchart 300 of a method for generating online storage 114 according to some embodiments. At 302, transformation service 112 retrieves interests for profiles from interests database 116-1. At 304, transformation service 112 retrieves entitlements for profiles from entitlements database 116-2. At 306, transformation service 112 retrieves location information from location database 116-3.

At 308, transformation service 112 generates documents that each include a user profile with respective interests, entitlements, and location information. At 310, transformation service 112 indexes entities from the interests in the profiles. Each entity lists user profiles that have indicated an interest in respective entities. Then, at 312, transformation service 112 combines the entitlements and location into an availability pair. For example, each possible combination of entitlements and location information may be combined into availability pairs.

At 314, transformation service 112 indexes the availability pairs. Also, the profiles that have the associated availability pairs are then added as entries to the availability pairs. At 316, transformation service 112 pre-orders the entities and availability pairs in a data structure in online storage 114.

Figure 5:
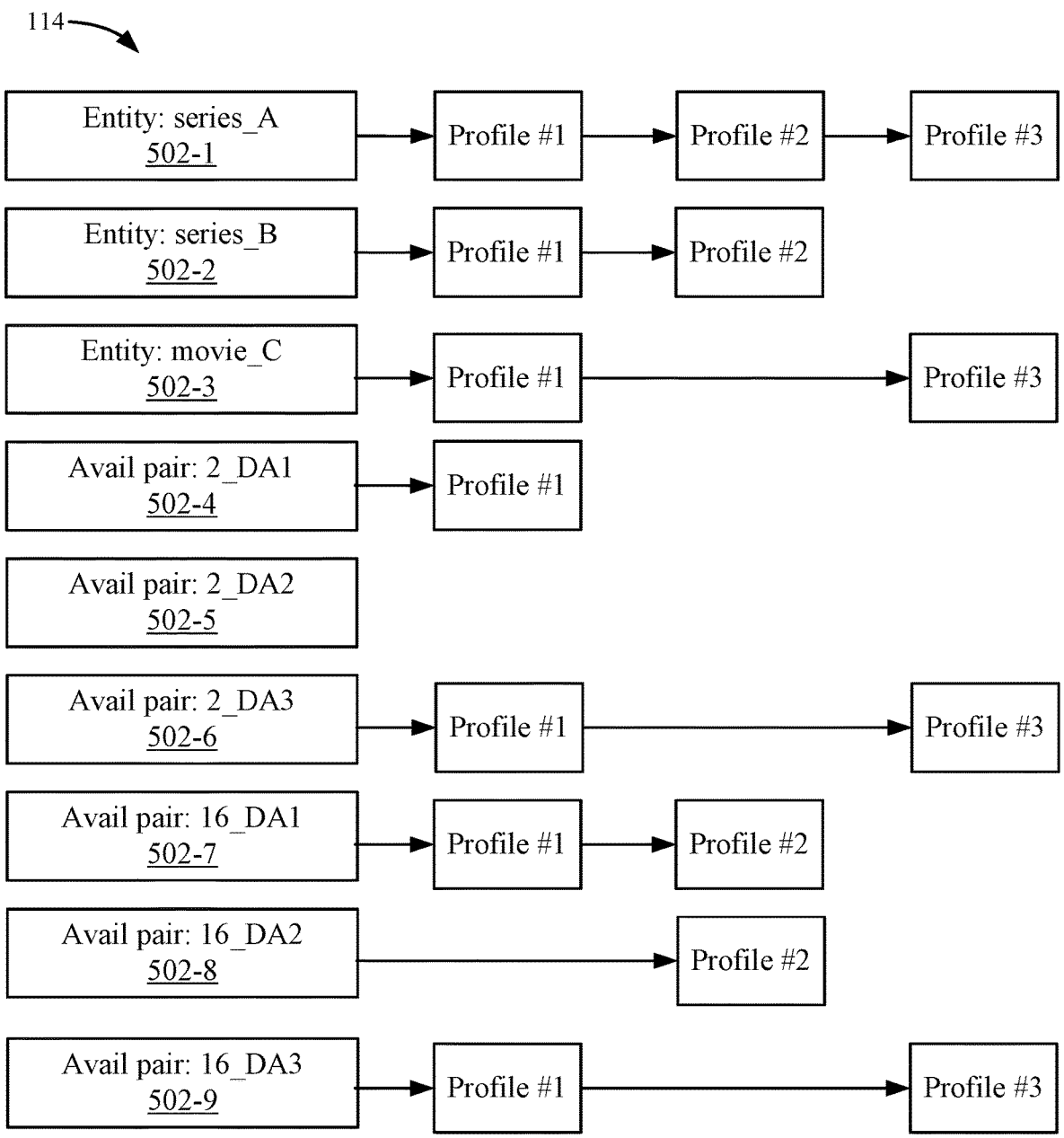
FIG. 5 depicts an example of an index in the online database according to some embodiments.

FIG. 5 depicts an example of an index in online storage 114 according to some embodiments. The index is shown at 502-1 to 502-9. For example, entities of series_A, series_B, and movie_C are shown at 502-1 to 502-3. Associated profiles for the entity are shown connected to the entities with arrows. For example, series_A is associated with profile #1, profile #2, and profile #3; series_B is associated with profile #1 and profile #2; and movie_C is associated with profile #1 and profile #3.

Then, availability pairs are indexed as shown at 502-4 to 502-9. The indexes are for different availability pairs of 2_DA1, 2_DA2, 2_DA3, 16_DA1, 16_DA2, and 16_DA3. The availability pairs represent the different possible combinations from the entitlements (#2 and #16) and locations (DA1, DA2, and DA3) found in profiles #1 to #3. The various profiles that include the entitlements and location pair are connected to each availability pair. If a profile did not include one of the combinations, such as the availability pair 2_DA2 at 502-5, then no profiles are associated with that availability pair. As can be seen, the different availability pairs are associated with different profiles. For example, availability pair 2_DA3 is associated with profile #1 and profile #3; availability pair 16_DA1 is associated with profiles #1 and profile #2; availability pair 16_DA2 is associated with profile #1 and profile #2; and availability pair 16_DA3 is associated with profile #1 and profile #3.

Real-Time Event Processing

Figure 6:
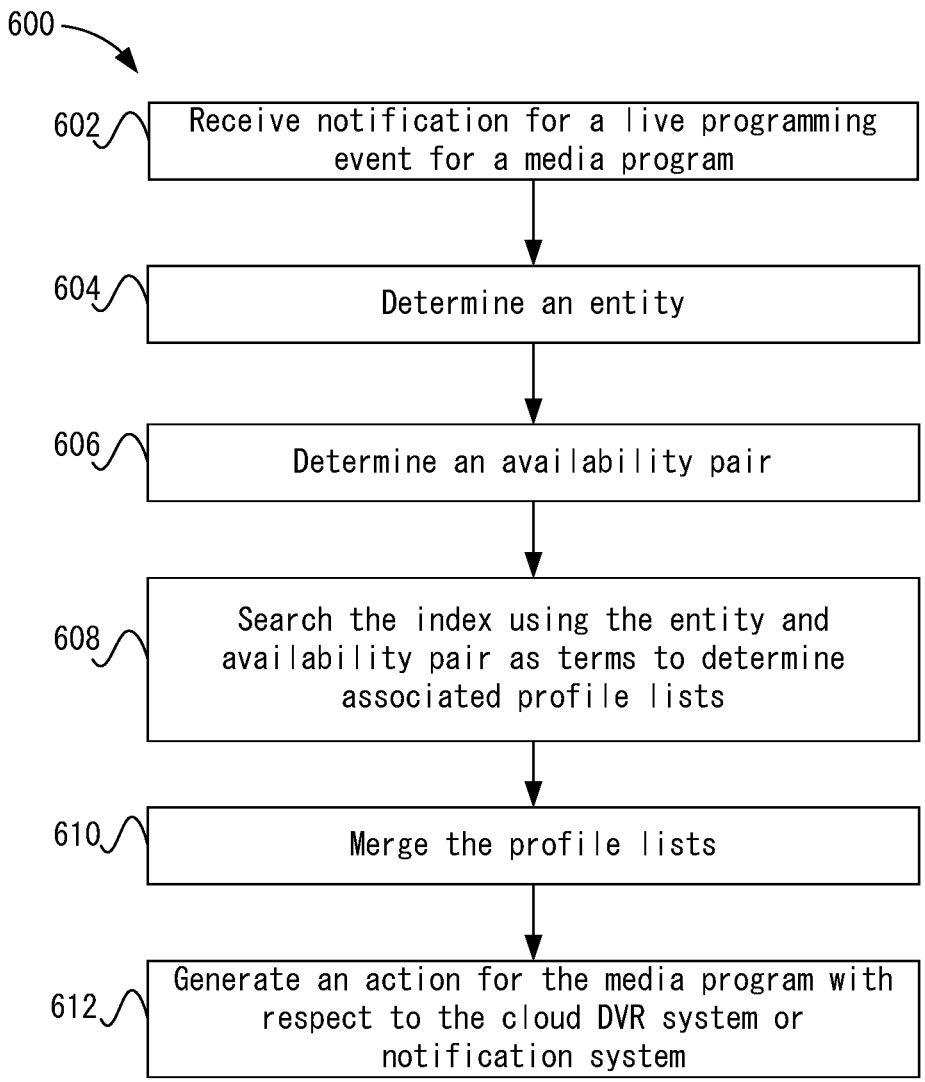
FIG. 6 depicts a simplified flowchart of a method for processing live programming events according to some embodiments.

Once the index in online storage 114 is built, then search engine 118 can process live programming events from live programming engine 106. FIG. 6 depicts a simplified flowchart 600 of a method for processing live programming events according to some embodiments. At 602, search engine 118 receives a notification for a live programming event associated with a media program. For example, live programming engine 106 may detect the occurrence of a live programming event, such as via the EPG. The notification may be for a media program X, which may be a specific media program, such as a specific episode of a show or a movie. In other embodiments, the event may be generalized to a show or series, such as series Y even though an episode of the series is currently being shown. The notification may also include other information, such as a base availability rule, which is a rule that defines availability for given content. For example, the rule may define any combination of the entitlements, the location information (e.g., home location or roaming location), the device type allowed to watch the content, and also the time window in which the content can be watched. Search engine 118 can parse the notification to determine the entity, entitlements, and distribution area. For example, search engine 118 may determine that media program X belongs to series_A, can only be watched by a live television subscription user (e.g., entitlements=#16), and within a location of Santa Monica area (distribution area=DA2). In other embodiments, live programming engine 106 may provide the relevant information for the entity, entitlements, and distribution area from an electronic programming guide. This information may be included in the metadata for the media program. For example, the distribution area may be associated with the channel in which the media program is being played, and the entitlements may be associated with the service in which the media program is being played. The entity may be determined based upon which series is associated with the media program.

From the parsing, at 604, search engine 118 determines an entity for the media program. The entity may be the media program that is going to start airing on the live television service. At 606, search engine 118 then determines an availability pair for the media program. Search engine 118 may form the availability pair by combining the entitlements and location information for the media program. In this case, the entity may be "entity: series_A" and the availability pair may be "availability pair: 16_DA2".

At 608, search engine 118 searches the index in online storage 114 using the entity and the availability pair as terms in a query to determine associated profile lists. For example, a search for the entity series_A and a search for the availability pair 16_DA2 are performed in the index shown in FIG. 5. Referring to FIG. 5, at 502-1, search engine 118 retrieves profiles #1, #2, and #3 because the entity in the query is series_A. Also, at 502-8, search engine 118 retrieves profile #2 because this profile is associated with availability pair 16_DA2.

At 610, search engine 118 may analyze the profile lists to merge the profiles for the queries. For example, search engine 118 may perform an Boolean logic AND operation on the list. This means that only profiles that are included on both lists are eligible. That is, search engine 118 determines the profiles that have an interest in the series and also are entitled to watch the series and are in a location available to watch the series. In this example, profile #2 is the only profile that is interested in the series and available to watch the series.

Once determining the applicable profiles, at 612, search engine 118 generates an action for the media program. For example, search engine 118 may generate an action for cloud DVR system 110 or notification system 120. In a first action, the action may direct cloud DVR system 110 to record the media program using cloud DVR 108. The second action may direct notification system 120 to generate a notification and send the notification to the profile. Although actions associated with the cloud DVR and notification systems are described, other actions may also be performed. For example, the action may start playback of the media program or adjust a user interface of the media program to recommend the media program.

Maintaining Online Storage 114

Figure 7:
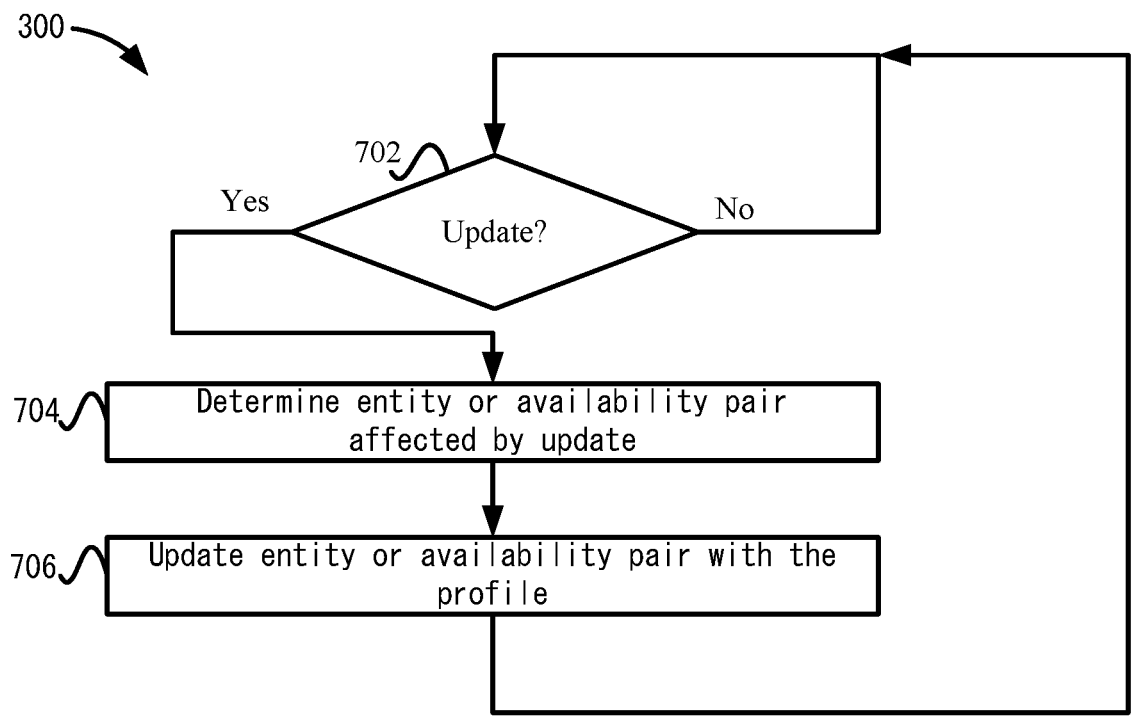
FIG. 7 depicts a simplified flowchart for maintaining the index in the online database according to some embodiments.

Search engine 118 has no external dependency on any other system and can be scaled horizontally. That is, multiple instances of search engine 118 may be included in video delivery system 102. The reliance on other services in the backend is eliminated and any delays that could be experienced using those external services are removed. Also, transformation service 112 and search engine 118 are different instances and do not affect the performance of each other. Search engine 118 is an online process that processes real-time events. Transformation service 112 may an offline process that is performed offline. This may require that online storage 114 be updated from the data in offline databases 116. For example, FIG. 7 depicts a simplified flowchart 700 for maintaining the index in online storage 114 according to some embodiments. At 702, transformation service 112 determines if an update to the index is required. For example, transformation service 112 may receive a notification that a user's interest has changed. If no update needs to be performed, then the process continues to monitor if any updates are needed. However, if an update is required, at 704, transformation service 112 determines a profile affected by the update. For example, transformation service 112 determines an entity or availability pair affected by the update. For example, either a profile may have an entity added to its interests or a profile may be affected and have its location changed or the entitlements changed. Then, at 706, transformation service 112 may find the entity or availability pair in the index and update it with the profile, if needed. For example, if the entity or availability pair is not associated with the profile, transformation service 112 updates the entity or availability pair with the profile. The updating of the index can be performed in this way due to the entity or the availability pair being indexed. The entity or availability pairs are not being changed in the index and thus the index does not need to be altered.

At some point, the index may be entirely rebuilt. Some reasons for rebuilding the index may be to capture different combinations of the entity or availability pairs. For example, entities or availability pairs may be added to the programming. Transformation service 112 determines whether to rebuild the index. If a rebuild is needed, then transformation service 112 performs the rebuild of the index. For example, the process described in FIG. 3 is performed again.

Accordingly, some embodiments provide more efficient searching for live programming events that occur. The live programming events may occur at serial intervals that cause a large increase in queries. By isolating the queries to online storage 114, traffic in the backend does not receive spiky traffic from the live programming events. Also, the data is transformed into a format specially designed for live programming events, which provides more efficient storage of data. This allows fewer queries to be performed by search engine 118. Additionally, the updating of the index is quicker.

System

Figure 8:
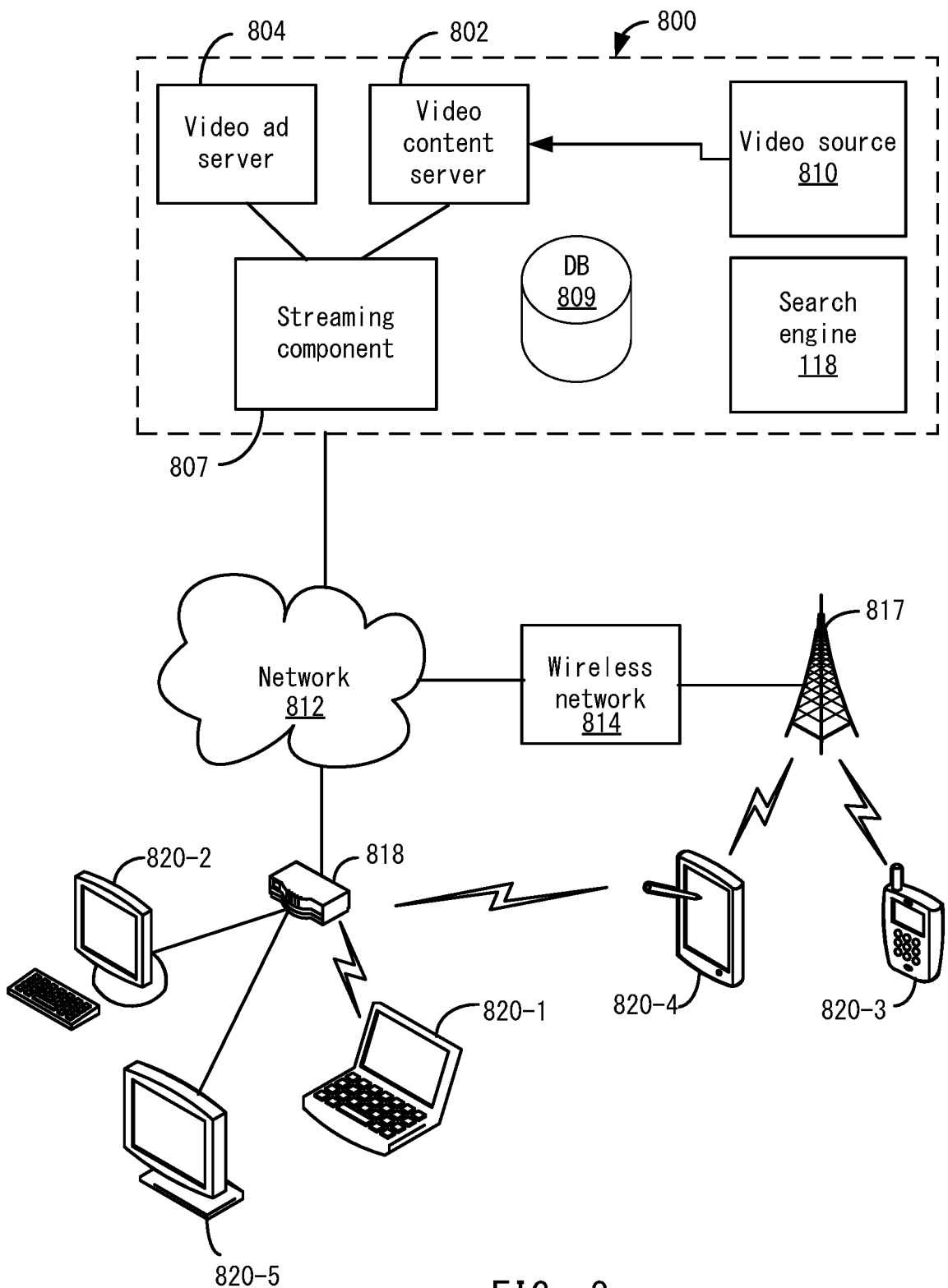
FIG. 8 depicts a video streaming system in communication with multiple client devices via one or more communication networks according to one embodiment.

Features and aspects as disclosed herein may be implemented in conjunction with a video streaming system 800 in communication with multiple client devices via one or more communication networks as shown in FIG. 8. Aspects of the video streaming system 800 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 800, video data may be obtained from one or more sources for example, from a video source 810, for use as input to a video content server 802. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 800 may include one or more computer servers or modules 802, 804, and/or 807 distributed over one or more computers. Each server 802, 804, 807 may include, or may be operatively coupled to, one or more data stores 809, for example databases, indexes, files, or other data structures. A video content server 802 may access a data store (not shown) of various video segments. The video content server 802 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 804 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 800, a public service message, or some other information. The video advertising server 804 may serve the video advertising segments as directed by a user interface controller (not shown).

The video streaming system 800 also may include search engine 118.

The video streaming system 800 may further include an integration and streaming component 807 that integrates video content and video advertising into a streaming video segment. For example, streaming component 807 may be a content server or streaming media server. A controller (not shown) may determine the selection or configuration of advertising in the streaming video based on any suitable algorithm or process. The video streaming system 800 may include other modules or units not depicted in FIG. 8, for example administrative servers, commerce servers, network infrastructure, advertising selection engines, and so forth.

The video streaming system 800 may connect to a data communication network 812. A data communication network 812 may comprise a local area network (LAN), a wide area network (WAN), for example, the Internet, a telephone network, a wireless cellular telecommunications network (WCS) 814, or some combination of these or similar networks.

One or more client devices 820 may be in communication with the video streaming system 800, via the data communication network 812 and/or other network 814. Such client devices may include, for example, one or more laptop computers 820-1, desktop computers 820-2, "smart" mobile phones 820-3, tablet devices 820-4, network-enabled televisions 820-5, or combinations thereof, via a router 818 for a LAN, via a base station 817 for a wireless telephony network 814, or via some other connection. In operation, such client devices 820 may send and receive data or instructions to the system 800, in response to user input received from user input devices or other input. In response, the system 800 may serve video segments and metadata from the data store 809 responsive to selection of media programs to the client devices 820. Client devices 820 may output the video content from the streaming video segment in a media player using a display screen, projector, or other video output device, and receive user input for interacting with the video content.

Distribution of audio-video data may be implemented from streaming component 807 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 807 may communicate with client device 820 using control messages and data messages to adjust to changing network conditions as the video is played. These control messages can include commands for enabling control functions such as fast forward, fast reverse, pausing, or seeking to a particular part of the file at the client.

Since streaming component 807 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched, (3) use transmission bandwidth more efficiently, since only the amount of data required to support the viewing experience is transmitted, and (4) the video file is not stored in the viewer's computer, but discarded by the media player, thus allowing more control over the content.

Streaming component 807 may use TCP-based protocols, such as HTTP and Real Time Messaging Protocol (RTMP). Streaming component 807 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 9:
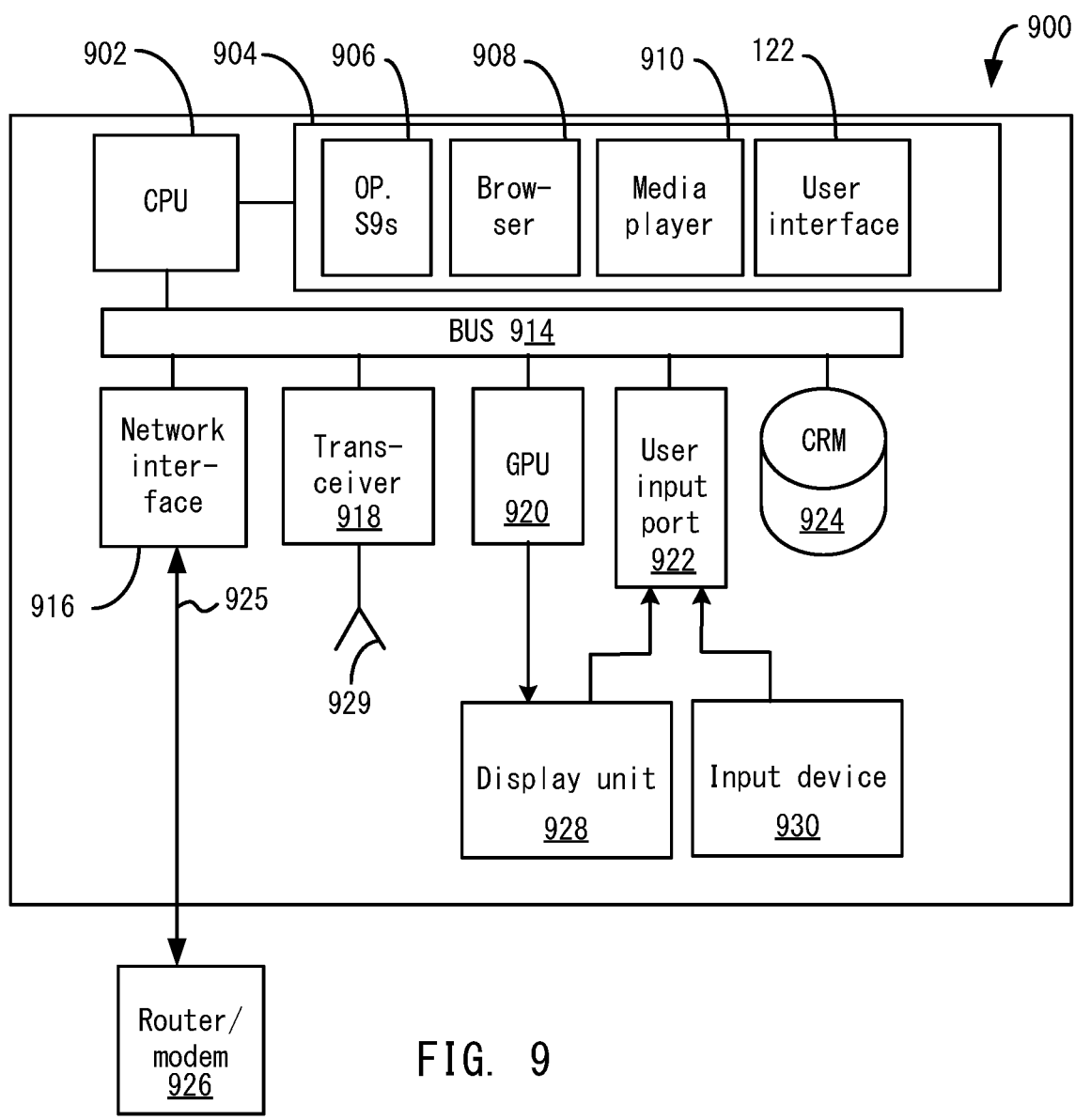
FIG. 9 depicts a diagrammatic view of an apparatus for viewing video content and advertisements.

Referring to FIG. 9, a diagrammatic view of an apparatus 900 for viewing video content and advertisements is illustrated. In selected embodiments, the apparatus 900 may include a processor (CPU) 902 operatively coupled to a processor memory 904, which holds binary-coded functional modules for execution by the processor 902. Such functional modules may include an operating system 906 for handling system functions such as input/output and memory access, a browser 908 to display web pages, and media player 910 for playing video. The modules may further include user interface 122. The memory 904 may hold additional modules not shown in FIG. 9, for example modules for performing other operations described elsewhere herein.

A bus 914 or other communication component may support communication of information within the apparatus 900. The processor 902 may be a specialized or dedicated microprocessor configured to perform particular tasks in accordance with the features and aspects disclosed herein by executing machine-readable software code defining the particular tasks. Processor memory 904 (e.g., random access memory (RAM) or other dynamic storage device) may be connected to the bus 914 or directly to the processor 902, and store information and instructions to be executed by a processor 902. The memory 904 may also store temporary variables or other intermediate information during execution of such instructions.

A computer-readable medium (CRM) in a storage device 924 may be connected to the bus 914 and store static information and instructions for the processor 902; for example, the storage device (CRM) 924 may store the modules 906, 908, and 910 when the apparatus 900 is powered off, from which the modules may be loaded into the processor memory 904 when the apparatus 900 is powered up. The storage device 924 may include a non-transitory computer-readable storage medium holding information, instructions, or some combination thereof, for example instructions that when executed by the processor 902, cause the apparatus 900 to be configured to perform one or more operations of a method as described herein.

A communication interface 916 may also be connected to the bus 914. The communication interface 916 may provide or support two-way data communication between the apparatus 900 and one or more external devices, e.g., the streaming system 800, optionally via a router/modem 926 and a wired or wireless connection. In the alternative, or in addition, the apparatus 900 may include a transceiver 918 connected to an antenna 929, through which the apparatus 900 may communicate wirelessly with a base station for a wireless communication system or with the router/modem 926. In the alternative, the apparatus 900 may communicate with a video streaming system 800 via a local area network, virtual private network, or other network. In another alternative, the apparatus 900 may be incorporated as a module or component of the system 800 and communicate with other components via the bus 914 or by some other modality.

The apparatus 900 may be connected (e.g., via the bus 914 and graphics processing unit 920) to a display unit 928. A display 928 may include any suitable configuration for displaying information to an operator of the apparatus 900. For example, a display 928 may include or utilize a liquid crystal display (LCD), touchscreen LCD (e.g., capacitive display), light emitting diode (LED) display, projector, or other display device to present information to a user of the apparatus 900 in a visual display.

One or more input devices 930 (e.g., an alphanumeric keyboard, microphone, keypad, remote controller, game controller, camera or camera array) may be connected to the bus 914 via a user input port 922 to communicate information and commands to the apparatus 900. In selected embodiments, an input device 930 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 928, for example using a touch sensitive screen. A cursor control device may communicate direction information and command selections to the processor 902 and control cursor movement on the display 928. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   using, by a computing device, a notification of a programming event to determine an entity of a media program and an availability pair, the availability pair identifying an entitlement and a location combination for viewing the media program;
   querying, by the computing device, a database using the entity and the availability pair in a query to determine a first set of user profiles associated with the entity and a second set of user profiles associated with the availability pair, the database comprising:
   entities for media programs that are associated with user profiles, and
   availability pairs that are associated with user profiles, wherein each availability pair identifies an entitlement and a location combination;
   analyzing, by the computing device, the first set of user profiles and the second set of user profiles to select at least a portion of the first set of user profiles and the second set of user profiles; and
   performing, by the computing device, an action for the at least the portion of the first set of user profiles and the second set of user profiles based on an occurrence of the programming event.

2. The method of claim 1, wherein the database comprises a first database, the method further comprising:

receiving information for the entities, the entitlements, and the location information from one or more second databases different from the first database, wherein the entities, the entitlements, and the location information are indexed by a plurality of user profiles in the one or more second databases.

3. The method of claim 2, further comprising:
transforming the information for the entities, the entitlements, and the location information from being indexed by the plurality of user profiles in the one or more second databases to being indexed by the entities and the availability pairs in the first database; and
associating user profiles in the plurality of user profiles as entries for the entities and the availability pairs in the first database.

4. The method of claim 2, wherein:
the one or more second databases are accessed by one or more first services, and
the first database is queried by a second service different from the one or more first services to perform the action, wherein the second service does not query the one or more second databases.

5. The method of claim 1, wherein analyzing the first set of user profiles and the second set of user profiles comprises:
merging the first set of user profiles and the second set of user profiles to select the at least the portion of the first set of user profiles and the second set of user profiles.

6. The method of claim 1, wherein the at least the portion of the first set of user profiles and the second set of user profiles have indicated an interest in the entity.

7. The method of claim 6, wherein the at least the portion of the first set of user profiles and the second set of user profiles are associated with the availability pair.

8. The method of claim 1, wherein the action comprises recording the programming event for the at least the portion of the first set of user profiles and the second set of user profiles.

9. The method of claim 8, wherein merging the first set of user profiles and the second set of user profiles comprises:
selecting user profiles that are found in both the first set of user profiles and the second set of user profiles.

10. The method of claim 8, wherein merging the first set of user profiles and the second set of user profiles comprises:
performing a Boolean AND operation on the first set of user profiles and the second set of user profiles.

11. The method of claim 1, wherein the action comprises recording the programming event for the at least the portion of the first set of user profiles and the second set of user profiles.

12. The method of claim 1, further comprising:
receiving an update to a user profile;
determining an entity or an availability pair that is affected by the update; and
finding the entity or the availability pair in the database and updating the entity or availability pair with information for the user profile.

13. The method of claim 1, wherein the database comprises a first database, the method further comprising:
receiving the entities from a second database;
receiving the entitlements from a third database;
receiving the location information from a fourth database; and
transforming the information for the entities, the entitlements, and the location information from being indexed by the plurality of user profiles to being indexed by the entities and the availability pairs.

14. The method of claim 1, wherein the database is only used to process one or more live programming events.

15. The method of claim 1, wherein generating the action comprises:
storing the media program in a recorder for each of the at least the portion of the first set of user profiles and the second set of user profiles.

16. A non-transitory computer-readable storage medium containing instructions, that when executed, control a computer system to be configured for:
using a notification of a programming event to determine an entity of a media program and an availability pair, the availability pair identifying an entitlement and a location combination for viewing the media program;
querying a database using the entity and the availability pair in a query to determine a first set of user profiles associated with the entity and a second set of user profiles associated with the availability pair, the database comprising:
entities for media programs that are associated with user profiles, and
availability pairs that are associated with user profiles, wherein each availability pair identifies an entitlement and a location combination;
analyzing the first set of user profiles and the second set of user profiles to select at least a portion of the first set of user profiles and the second set of user profiles; and
performing an action for the at least the portion of the first set of user profiles and the second set of user profiles based on an occurrence of the programming event.

17. An apparatus comprising:
one or more computer processors; and
a computer-readable storage medium comprising instructions for controlling the one or more computer processors to be operable for:
using a notification of a programming event to determine an entity of a media program and an availability pair, the availability pair identifying an entitlement and a location combination for viewing the media program;
querying a database using the entity and the availability pair in a query to determine a first set of user profiles associated with the entity and a second set of user profiles associated with the availability pair, the database comprising:
entities for media programs that are associated with user profiles, and
availability pairs that are associated with user profiles, wherein each availability pair identifies an entitlement and a location combination;
analyzing the first set of user profiles and the second set of user profiles to select at least a portion of the first set of user profiles and the second set of user profiles; and
performing an action for the at least the portion of the first set of user profiles and the second set of user profiles based on an occurrence of the programming event.

18. The apparatus of claim 17, wherein the database comprises a first database, the instructions further operable for:
receiving information for the entities, the entitlements, and the location information from one or more second databases different from the first database, wherein the entities, the entitlements, and the location information are indexed by a plurality of user profiles in the one or more second databases.

19. The apparatus of claim 18, wherein the instructions are further operable for:
- transforming the information for the entities, the entitlements, and the location information from being indexed by the plurality of user profiles in the one or more second databases to being indexed by the entities and the availability pairs in the first database; and
- associating user profiles in the plurality of user profiles as entries for the entities and the availability pairs in the first database.

20. The apparatus of claim 18, wherein:
- the one or more second databases are accessed by one or more first services, and
- the first database is queried by a second service different from the one or more first services to perform the action, wherein the second service does not query the one or more second databases.

* * * * *